Figure 1:
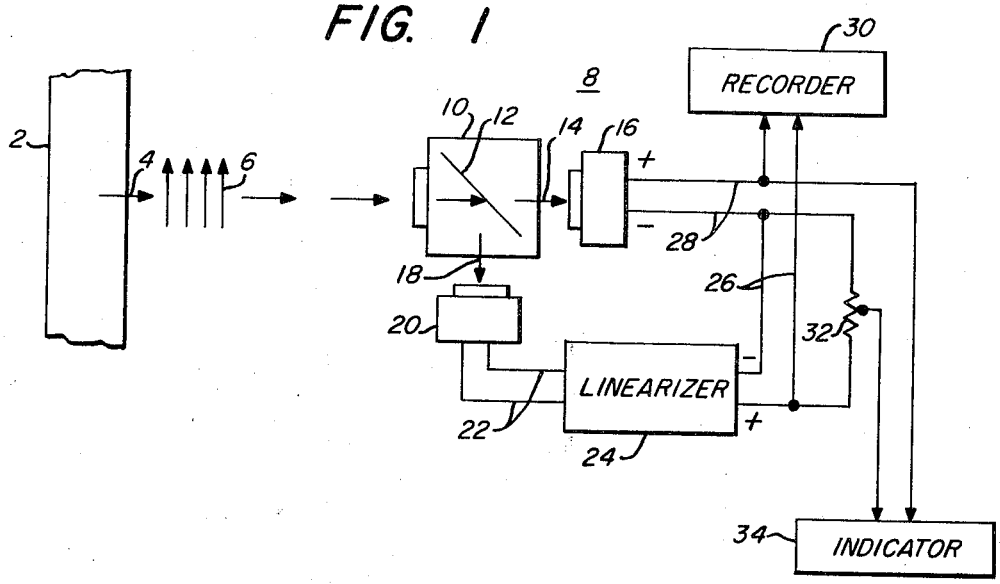

United States Patent [19]

Murray

[11] 3,759,102

[45] Sept. 18, 1973

[54] APPARATUS FOR DETERMINING CORRECT PYROMETER READINGS WITH STEAM INTERFERENCE PRESENT

[75] Inventor: Thomas P. Murray, Pittsburgh, Pa.

[73] Assignee: United States Steel Corporation, Pittsburgh, Pa.

[22] Filed: Mar. 25, 1971

[21] Appl. No.: 127,900

[52] U.S. Cl.............................................. 73/355 R
[51] Int. Cl. ......... G01j 5/06, G01j 5/10, G01j 5/60
[58] Field of Search................... 73/355 R, 355 EM

[56] References Cited
UNITED STATES PATENTS

| | | | |
|---|---|---|---|
| 2,658,390 | 11/1953 | Machler...................... | 73/355 EM |
| 3,611,806 | 10/1971 | Hishikari..................... | 73/355 R |
| 3,314,293 | 4/1967 | Schraeder................... | 73/355 EM |
| 3,435,237 | 3/1969 | Collins........................ | 73/355 R X |
| 3,454,769 | 7/1969 | Dynes......................... | 73/355 EM X |
| 3,286,524 | 11/1966 | Malone........................ | 73/355 R X |

*Primary Examiner*—Richard C. Queisser
*Assistant Examiner*—Frederick Shoon
*Attorney*—Rea C. Helm

[57] ABSTRACT

Apparatus for determining correct pyrometer readings with steam interference present uses a silicon cell pyrometer and a total-radiation pyrometer to measure surface temperature of a steel slab at hot-rolling temperature. The output of the silicon cell is linearized as a multiple of the total-radiation pyrometer output by the ratio of the error of the two pyrometer readings when steam is present. The two outputs are combined to provide a true temperature reading.

10 Claims, 2 Drawing Figures

Patented Sept. 18, 1973

3,759,102

INVENTOR
THOMAS P. MURRAY

By Rex C. Helm
Attorney

APPARATUS FOR DETERMINING CORRECT PYROMETER READINGS WITH STEAM INTERFERENCE PRESENT

This invention relates to apparatus for determining the true temperature of a surface when there is interference with the passage of thermal radiation between the surface and a temperature determining device and more particularly to apparatus for determining the true surface temperature of steel during a hot-rolling operation where steam, inherent in the rolling operation, attenuates the thermal radiation falling upon a pyrometer.

An accurate knowledge of the true finishing temperature is essential for the best operation of a hot strip steel rolling mill. However, since steam, spray, dust or smoke attenuate radiation, they must be removed from the optical path between the hot strip surface and the pyrometer before an accurate temperature measurement may be made. If these interfering substances are not removed, absorption or scattering takes place, reducing the radiation intensity reaching a detector which will then indicate a lower surface temperature than the actual surface temperature. Because of the conditions usually surrounding a hot strip steel rolling mill, it is not possible to eliminate interference completely from temperature determination.

The amount of error in temperature determinations under such circumstances depends upon the type of radiation detector used and the type of interfering material. Some ratio or two-color pyrometers are much less affected by path interference than total radiation or single-band pyrometers in such surroundings, but all available ratio pyrometers have deficiencies which render them unsuitable for finishing temperature measurements in hot strip mills. Photomultiplier units are unstable in calibration. Silicon cell ratio pyrometers currently available will read only down to about 1,450° F, so that the bulk of finishing temperature measurements, about 1,520° F, would be made at very low output levels. Lead sulfide ratio pyrometers are affected much less by lens dirt, but are affected as much by steam, than the much simpler, cheaper, and more stable silicon cell single-band unit. Errors of thermoelectric units have been combined with layers of differing thermal impedance to determine temperature as in Malone U.S. Pat. No. 3,286,524, but surrounding conditions precluded the use of such devices in hot strip mills.

The present invention uses two pyrometers which have different spectral response characteristics and are therefore affected differently by various types of path interferences. Therefore, if path interference exists, the pyrometers are in error by different amounts and will not read the same temperature. Since the error of one pyrometer is a relatively constant multiple of the error of the other pyrometer, the two readings are combined in a circuit to correct the temperature reading of the higher reading, or more accurate, pyrometer and thus provide a true temperature indication. The difference between the two uncorrected temperature indications is also used to indicate excessive interference which may require corrective action.

It is therefore an object of my invention to provide apparatus for determining the true temperature of a surface where radiation from the surface is attenuated by an interfering substance.

Another object of my invention is to provide apparatus in which the true temperature is automatically determined.

Still another object is to provide apparatus for indicating excessive interference.

Figure 2:
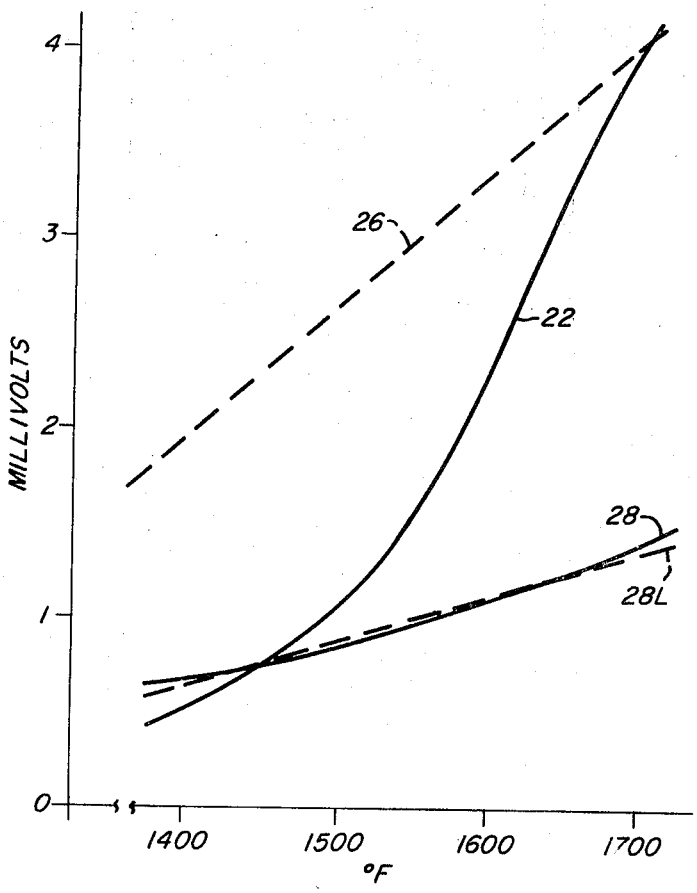

These and other objects will become more apparent after referring to the following specification and drawing in which:

FIG. 1 is a schematic drawing of the preferred embodiment of the apparatus of my invention; and FIG. 2 is a graph showing pyrometer characteristics and illustrates the principles of my invention.

Referring now to FIG. 1, reference numeral 2 represents a moving hot steel strip providing radiation 4 attenuated by steam 6 in its path towards a temperature determining device shown generally at 8. The radiation enters a beam splitter 10 having a mirror 12 which transmits a beam 14 to a total-radiation pyrometer 16, such as a Leeds and Northrup Tayotube Model 8898 manufactured by Leeds and Northrup Corporation, North Wales, Pa., and reflects a beam 18 to a second pyrometer 20, such as an IRCON Silicon Cell Model 11X2 manufactured by IRCON Data Systems, Inc., Niles, Ill. An output 22 of pyrometer 20 is connected to an input of a linearizer 24, such as an IRCON Linearizer Model SC11X-2S manufactured by IRCON Data Systems, Inc., of Niles, Ill. An output 26 of linearizer 24 and an output 28 of pyrometer 16 are connected to a recorder 30, such as a Leeds and Northrup Speedomax G Strip Chart Recorder manufactured by Leeds and Northrup Corporation, North Wales, Pa. Output 26 is also connected to a voltage divider 32 providing an output one-third the value of output 26. The output of voltage divider 32 is connected in a subtractive relationship from output 28 to an indicator 34.

Both pyrometers 16 and 20 are susceptible to errors from steam 6 as well as water, dust or smoke that may be in the optical path between strip 2 and beam splitter 10. However, it has been experimentally determined that the ratio of errors is relatively constant for the same type of interference and that the ratio of the error of pyrometer 16 to the error of pyrometer 20 is constant at three to one at rolling temperatures for hot rolled strip steel.

This experimentally determined ratio is confirmed by a theoretical calculation. Assume an output concave for a silicon cell pyrometer, a curve showing millivoltage versus temperature. Over a limited portion of this curve, and particularly within the temperature range of interest, the curve will fit the following equation:

$$V = K \Sigma T^n \tag{1}$$

where $V1$ is the millivoltage output, $K$ and $n$ are constants, $\Sigma 0$ is the target emittance and $T$ is the temperature in degrees Kelvin.

If Wien's law holds, that is, if $e^{C_2/\lambda T} \gg 1$, where $C_2 = 1.438$ cm $-°$ K, $\lambda$ is the wave length in centimeters and $T$ is degrees Kelvin, then the output curve can also be expressed as:

$$V = K_1 \epsilon e^{-C_2/\lambda T} \tag{2}$$

where $K_1$ is a constant.

If equation (1) is differentiated, it becomes:

$$dV = KT^n d\epsilon + nK\epsilon T^{n-1} dT \quad (3)$$

and if equation (2) is differentiated, it becomes:

$$dV = K_1 e^{-C_2/\lambda T} d\epsilon + (C_2/\Sigma T^2) K_1 \epsilon e^{-C_2/\lambda T} dt \quad (4)$$

If equation (3) is divided by equation (1), it results in:

$$dV/V = (d\epsilon/\epsilon) + (n\, dT/T) \quad (5)$$

and if equation (4) is divided by equation (2), it results in:

$$dV/V = (d\epsilon/\epsilon) + (C_2/\lambda T)(dT/T) \quad (6)$$

Since equations (5) and (6) are equivalent, the coefficients of $dT/T$ are equal so that $$n = C_2/\lambda T \quad (7)$$

For a silicon cell at 1,520° F, a common aim steel finishing temperature $$n = (1.438 \text{ cm} + °K)/(0.90 \text{ cm} \times 10^{-4})(1,100° K)$$

or $$n = 14.5$$

The value of $n$ for the total-radiation unit is well known at about 5. Equations (5) and (6) then have coefficients for $dT/T$ of 14.5 for the silicon cell and 5 for the total-radiation pyrometer. Thus if there is a change in emittance, for example 5 percent, then for the total-radiation unit the apparent temperature will change by 1 percent, but the apparent temperature indicated by the silicon cell would change by 5/14.5 percent, an approximate error ratio of 2.9 to 1, very close to the experimentally determined 3 to 1 ratio. This means that most of the experimental error, even due to steam, is due to scattering of the radiation out of the sight path, and is not caused by selective spectral absorption.

This error ratio of the two pyrometers 16 and 20 is then used in the following manner:

Let $T_s$ be the apparent temperature as measured by the silicon cell pyrometer 20, Let $T_R$ be the apparent temperature as measured by the total-radiation pyrometer 16, and Let $T_{true}$ be the true temperature.

Then $$T_S = T_{true} - \Delta T \quad (8)$$

where $\Delta T$ is the error in the silicon cell pyrometer 20 caused by steam, smoke or dust. Since the error of pyrometer 16 is three times the error of pyrometer 20, $$T_R = T_{true} - 3\Delta T \quad (9)$$

and $$\Delta T = T_S - T_R/2 \quad (10)$$

Before equation (10) may be applied, the pyrometers must both be calibrated on a black body source, and for the hot rolled steel strip, for an emittance factor of 0.80. These operations are well known in the art and are therefore not discussed. Next the millivolt outputs of each pyrometer are linearized. As shown in FIG. 2, the curve marked 28 shows the response of pyrometer 16 in millivolts for the approximate temperature range of 1,400° F to 1,700° F, the temperature range of interest. Although this curve follows the well-known power law, it is sufficiently close to a linear response, which would be curve 28L of FIG. 2, that the response may be assumed to be linear over the limited temperature range shown.

Curve 22 shows a typical response of pyrometer 20 converted to millivolts. This non-linear output is then converted to output 26 by linearizer 24. As shown in FIG. 2, output 26 is three times output 28L for any given temperature so that the calculation is simplified.

Equation (8) may be rewritten by substituting equation (10) for $\Delta T$ so that $$T_{true} = T_S + (T_S - T_R/2) = 3T_S - T_R/2 \quad (11)$$

or substituting millivolt outputs for temperatures, $V_S$ from the silicon cell 20 and $V_R$ from the total-radiation pyrometer 16, $$V_{true} = 3V_S - V_R/2 \quad (12)$$

where $V_{true}$ is the input voltage to recorder 30, $3V_S$ is output 26 from linearizer 24 and $V_R$ is output 28 from pyrometer 16. To avoid dividing by two, recorder 30 is calibrated so that its input voltage $3V_S - V_R$ corresponds to a given temperature.

While the system so far described is intended to correct for errors caused by steam, the system could also be used where there are other types of interference, such as dust or water droplets. Because some types of interference are selective as to wave length, and some types of interferences will scatter the radiation, the error ratio might not be 3 as has been experimentally determined with steam. However, even with an error ratio of 2.3, which is typical with transmission through neutral screens or dust, the system is in error an amount which is within the desired limits of accuracy in steel rolling. To minimize this type of error, the optical system should be kept clean.

Any radiation device is affected by path intereference to some extent and appreciable errors result if this intereference exceeds a certain limit. If the differences between the temperature indications of the two pyrometers as shown by indicator 34 exceeds a certain limit, it can be used to indicate that the intereference is excessive and that corrective action should be taken to maintain the accuracy of the true temperature recording on recorder 30. It could indicate, for example, a dirty lens or excessive dust or steam. Indicator 34 could also include an automatic alarm to indicate that interference is beyond acceptable limits. Signals 22 and 28 could be connected to indicator 34 without linearizer 24 and voltage divider 32, but the connections as shown require no other changes because the signals are compatible.

Equation (12) may be rewritten as:

$$V_{true} = m^v A - V_B/m - 1 \qquad (13)$$

where $m$ is the error ratio between two pyrometers having outputs $V_A$ and $V_B$. This would hold for any non-selective, or substantially non-selective intereference and any two pyrometers having different error responses to the same interference. If one pyrometer does not have a linear response, at least in the temperature range of interest, it may be necessary to linearize the outputs of both pyrometers.

It is not necessary that a beam splitter be used; the two pyrometers could be used side by side so long as they receive radiation from the same source. The beam splitter eliminates any potential error by assuring that the measured radiation omes from a single source, but the system may require calibration in case the beam splitter attenuates the radiation to the two pyrometers by different factors.

In applications where computers are available, as on some process lines, it is obvious that the necessary logic can be performed by a computer to obtain a corrected temperature readout and also to use the difference in readings to automatically sound an alarm for corrective action.

This invention eliminates the ambiguity now existing in temperature measurements made by radiation devices under conditions of possible path interference from steam or smoke and makes it possible to obtain assurance that path interference either does not exist or is within acceptable limits, and that the indicated temperature corresponds to the actual target temperature.

I claim:

1. Apparatus for determining the true temperature of a surface from the radiation emitting from the surface where radiation from the surface received by a detector is attenuated by an interfering substance causing erroneous detection comprising a first radiation detector having a known error characteristic caused by the interfering substance and aligned to receive radiation from the surface for providing a first signal responsive to radiation received from said surface; a second radiation detector having a known error characteristic caused by the interfering substance, a different wave length response characteristic than said first detector, an error response substantially a constant multiple of the error response in said first signal and aligned to receive radiation from the same location on said surface as said first detector for providing a second signal response to radiation received from said surface; means connected to said means for providing a second signal for providing a third signal by changing said second signal by said multiple; and means connected to said first detector and said means for providing a third signal and responsive to said first and third signals for combining said first and third signals and said known error characteristics thereby providing a fourth signal representative of the true temperature.

2. Apparatus according to claim 1 which includes a beam splitter adapted to receive radiation from said location on said surface and pass part of said radiation to said first detector and part of said radiation to said second detector.

3. Apparatus according to claim 1, in which said surface is steel heated to hot-rolling temperature, said interfering substance is steam, said first detector is a total-radiation pyrometer, and said second detector is a silicon cell pyrometer.

4. Apparatus according to claim 1 in which said first signal responds to changes in the temperature of said surface essentially linearly and said means for providing a third signal includes a linearizer.

5. Apparatus according to claim 1 in which the means for providing a third signal and for combining said first and third signals and said known error characteristics is a computer.

6. Apparatus according to claim 1 in which said means for combining signals includes a recorder, means connected to said first detector and said means for providing a third signal for providing an input signal to said recorder by subtracting the smaller of said first signal and said third signal from the larger signal and means in said recorder for converting said input signal to a temperature indication by dividing said input signal by a factor determined by subtracting one from said multiple.

7. Apparatus according to claim 6 which includes a beam splitter adapted to receive radiation from said location on said surface and pass part of said radiation to said first detector and part of said radiation to said second detector.

8. Apparatus according to claim 1 which includes an indicator and a voltage divider connected to said indicator, said first detector and said means for providing a third signal whereby said voltage divider reduces said third signal by said multiple and provides an input signal to said indicator determined by subtracting the smaller of said first signal and the reduced third signal from the larger signal.

9. Apparatus according to claim 8 in which said indicator includes means for indicating an alarm when said input signal to said indicator exceeds a predetermined limit.

10. Apparatus according to claim 8 which includes a beam splitter adapted to receive radiation from said location on said surface and pass part of said radiation to said first detector and part of said radiation to said second detector.

* * * * *

UNITED STATES PATENT OFFICE
CERTIFICATE OF CORRECTION

Patent No. 3,759,102    Dated September 18, 1973

Inventor(s) Thomas P. Murray

It is certified that error appears in the above-identified patent and that said Letters Patent are hereby corrected as shown below:

Column 2, line 19, "Tayotube" should read -- Rayotube --; line 46, "concave" should read -- curve --; line 52, equation (1), "V = KΣT$^n$" should read -- V = Kε T$^n$ --; line 55, "V 1" should read -- V --; line 56, "Σ0" should read -- ε --; line 59, "1,438" should read -- 1.438 --. Column 3, line 6, equation (4) should appear as shown below:

$$dV = K_1 e^{-C_2 \lambda T} d\varepsilon + (C_2/\lambda T^2) K_1 \varepsilon e^{-C_2/\lambda T} dT$$

line 31, should appear as shown below:

$$n = (1.438 \text{ cm} - °K)/(0.90 \text{ cm} \times 10^{-4})(1,100°K)$$

Column 5, line 6, equation (13) should appear as shown below:

$$V_{true} = (mV_A - V_B)/(m-1)$$

Signed and sealed this 16th day of July 1974.

(SEAL)
Attest:

McCOY M. GIBSON, JR.
Attesting Officer

C. MARSHALL DANN
Commissioner of Patents